United States Patent [19]

Powell et al.

[11] Patent Number: 5,113,193

[45] Date of Patent: May 12, 1992

[54] AUTONOMOUS SYNCHRONIZATION OF A BISTATIC SYNTHETIC APERTURE RADAR (SAR) SYSTEM

[75] Inventors: Norman F. Powell, Ellicott City, Md.; Henry G. Mallean, Woodland Hills, Calif.

[73] Assignee: The United States of America as represented by the Secretary of the Air Force, Washington, D.C.

[21] Appl. No.: 795,571

[22] Filed: Nov. 12, 1985

[51] Int. Cl.⁵ .............................................. G01S 13/90
[52] U.S. Cl. ........................................ 342/25; 342/109
[58] Field of Search ............ 343/5 CM, 9 R; 342/25, 342/109

[56] References Cited

U.S. PATENT DOCUMENTS

| | | | |
|---|---|---|---|
| 3,487,462 | 12/1969 | Holberg | 343/12 R |
| 3,808,596 | 4/1974 | Kazel | 342/191 X |
| 3,812,493 | 5/1974 | Afendykiw et al. | 343/12 R |
| 4,048,637 | 9/1977 | Jacomini | 342/161 |
| 4,179,696 | 12/1979 | Quisenberry | 342/195 X |
| 4,246,580 | 1/1981 | Caputi, Jr. | 343/5 CM |
| 4,325,065 | 4/1982 | Caputi, Jr. | 343/5 CM |
| 4,370,656 | 1/1983 | Frazier et al. | 343/112 D |
| 4,456,862 | 6/1984 | Yueh | 318/561 |

*Primary Examiner*—T. H. Tubbesing
*Attorney, Agent, or Firm*—William G. Auton; Donald J. Singer

[57] ABSTRACT

An airborne bistatic radar synchronization apparatus and process is presented which receives clutter point echo returns from the bistatic radar receiver on a penetrator aircraft, and determines therefrom the location of the illuminator aircraft without the need of receiving direct path signals from the radar transmitter on board the illuminator aircraft. Once the state of the illuminator aircraft (position and velocity) has been determined, the estimate of the illuminator state may be refined using direct path data. Finally, a target location algorithm is applied to bistatic target echo returns to calculate an equivalent monostatic range for a desired target, and provide an estimate of the location of the target.

7 Claims, 4 Drawing Sheets

AUTONOMOUS SYNCHRONIZATION OF A BISTATIC SYNTHETIC APERTURE RADAR (SAR) SYSTEM

STATEMENT OF GOVERNMENT INTEREST

The invention described herein may be manufactured and used by or for the Government for governmental purposes without the payment of any royalty thereon.

BACKGROUND OF THE INVENTION

The present invention is a method and apparatus which enables the receiver of an airborne bistatic radar to estimate the state of an illuminator aircraft (position and velocity), by measuring and processing disjoint clutter cell backscattered Radio Frequency (RF) energy received at the receiver aircraft in an adaptive Kalman filter algorithm.

In a monostatic radar configuration, the transmitter and receiver are located at the same radar site. In this arrangement, the radar determines the slant range to the target directly from the time delay or phase delay of the received signal with respect to the transmitted signal. When the bistatic radar configuration is utilized, the radar transmitter and receiver are located at different radar sites.

The transmitter emits electromagnetic radiation signals having a time reference base, such as pulses (radar signals), and the receiver detects reflected radiation from targets illuminated by the transmitted radar signal. The range of the target may be determined by the time it takes a pulse of the electromagnetic radiation to travel from the transmitter to the target and then by reflection from the target back to the receiver. The transmitted pulses are focused in a narrow beam, and the bearing of the target is determined by the bearing of the transmitter's antenna at the time the reflected pulse is received. When used in military aircraft, monostatic radar has the disadvantage that the transmitter can be detected at long range (hundreds of miles) by the electromagnetic pulses it emits. , This allows the enemy to detect the presence of an aircraft and also to determine its bearing. To get around this disadvantage, bistatic passive radar was developed. Bistatic passive radar does not have a transmitter but rather has a receiver system that utilizes the radiation emitted by any monostatic radar system in its reception area. The transmitter of a monostatic radar system which is being used by a bistatic passive radar system is known as the host transmitter.

The airborne bistatic radar systems entail the use of two aircraft: the first aircraft possesses the radar transmitter and is referred to as an "illuminator"; the second aircraft possesses a passive bistatic radar receiver. The illuminator airpath is at comparatively moderate-to-high altitudes, and provides illumination of an enemy ground area of interest, the penetrator aircraft flies at comparatively low altitudes in order to avoid detection by the enemy.

The low altitudes planned for penetrator aircraft will often result in the penetrator not being within line-of-sight of the illuminator aircraft, which results in the need for some method of determining the illuminator's state (position and velocity). This task is alleviated, to some degree by the prior art techniques disclosed in the following U.S. Patents:
U.S. Pat. No. 3,487,462 issued to Holberg;
U.S. Pat. No. 3,812,493 issued to Afendykiw et al;
U.S. Pat. No. 4,246,580 issued to Caputi, Jr.;
U.S. Pat. No. 4,325,065 issued to Caputi, Jr.;
U.S. Pat. No. 4,370,656 issued to Frazier et al; and
U.S. Pat. No. 4,456,862 issued to Yueh.

All of the patents listed above, with the exception of the Yueh patent, disclose bistatic synthetic aperture radar systems, and are incorporated herein by reference. Both of the Caputi patents, as well as that of Frazier et al, disclose airborne bistatic radar systems entailing a first aircraft possessing a long range radar transmitter, and a second aircraft with a receiver. The distance between the two aircraft is determined when the second aircraft receives direct path signals, which are received directly from the transmitter on the first aircraft. However, in order to receive direct path signals from the first aircraft, the second aircraft must fly with a sufficient altitude and position to maintain a line-of-sight contact with the first aircraft.

The problem the present invention seeks to solve is to enable airborne bistatic radar systems to function without the requirement of maintaining line-of-sight contact or the 1 necessity of receiving direct path signals. While the Holdberg invention is a bistatic radar system which does not require a reference direct path transmission, it is a land-based system in which the relative positions between the transmitter and receiver are known. Holdberg serves to clarify the problem the present invention is intended to solve: in order to make sense of received bistatic radar signals, the receiver needs to know the state of the transmitter.

The Yueh patent discloses a missile navigation system with 1 a Kalman estimator, in which the target is illuminated by the mother ship or launching platform. However, this still doesn't solve the present problem since the missile "knows", at least initially, the location of its point of launch.

The bistatic radar receiver of Afendykiw et al also relies on the traditional solution of receiving a direct path reference signal from the transmitting radar.

In view of the foregoing discussion, it is apparent that there currently exists the need for an airborne bistatic radar system in which the receiver aircraft is able to determine the illuminator aircraft's state without maintaining direct path reference signal contact with the illuminator aircraft. The present invention is directed towards satisfying that need.

SUMMARY OF THE INVENTION

This invention is directed to a method in which the receiver of a bistatic radar system can estimate the state of an illuminator aircraft to enable formation of a Synthetic Aperture Radar (SAR) image without the requirement for an illuminator-to-receiver aircraft data link. Estimation of the illuminator's state (position, velocity) is made by measuring and processing disjoint clutter cell backscattered Radio Frequency (RF) energy received at the receiver aircraft in an adaptive Kalman filter algorithm. It includes a stand-off aircraft flying in safe air space providing illumination of an enemy ground area of interest, and a pop-up penetrating aircraft that acquires targets and delivers weapons covertly by processing backscattered data generated from the bistatic illumination signal. After an initial prepenetration time synchronization, the penetrating aircraft operates adaptively via measurements on the bistatic radar data. The location and velocity of the illuminator are determined by an algorithm that operates on range, doppler and monopulse measurements on clutter data that is received from the ground in the vicinity of the penetrating aircraft. The location and velocity of the illuminator thus derived provides a workable basis for SAR imaging and enables a determination of the location of a target relative to the penetrator to facilitate weapon delivery.

It is a principal object of the present invention to enable the receiver of an airborne bistatic radar system to estimate the state of the illuminator aircraft (position and velocity) by measuring and processing clutter echo returns.

It is another object of the present invention to allow the penetrator aircraft to determine the location of the illuminator aircraft without maintaining a direct path reference signal contact with it.

It is another object of the present invention to enable the receiver of an airborne bistatic radar system to transform received bistatic radar target echo return signals into the equivalent of monostatic target echo return signals.

These together with other objects features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention is a method and apparatus which enables the receiver of an airborne bistatic radar to estimate the state of an illuminator aircraft (position and velocity) by measuring and processing disjoint clutter cell backscattered Radio Frequency (RF) energy received by the receiver aircraft in an adaptive Kalman filter algorithm.

One of the reasons for the use of bistatic radar systems in military aircraft, is that monostatic radar has the disadvantage that the transmitter can be detected at long range by the pulses it emits. This allows the enemy to detect the presence of the aircraft and to determine its bearing.

The prior art airborne bistatic radar systems depend upon maintaining a direct path reference signal between the two aircraft so that the receiver aircraft can determine the position and velocity of the illuminator aircraft. In actual military operations, the effects of irregular terrain, limitations imposed by covert operation, and limited direct path illumination due to terrain obscuration at low altitude, all combine to engender the need for an alternative method of determining the illuminator aircraft's state without maintaining the direct path reference signal. The present invention enables the receiver aircraft of an airborne bistatic radar system to determine the illuminator aircraft's state using one of three possible modes of operation:

1. no direct path processing throughout the mission;
2. direct path during terminal targeting only; and
3. direct path timing reference available throughout ingress and targeting.

Figure 1:
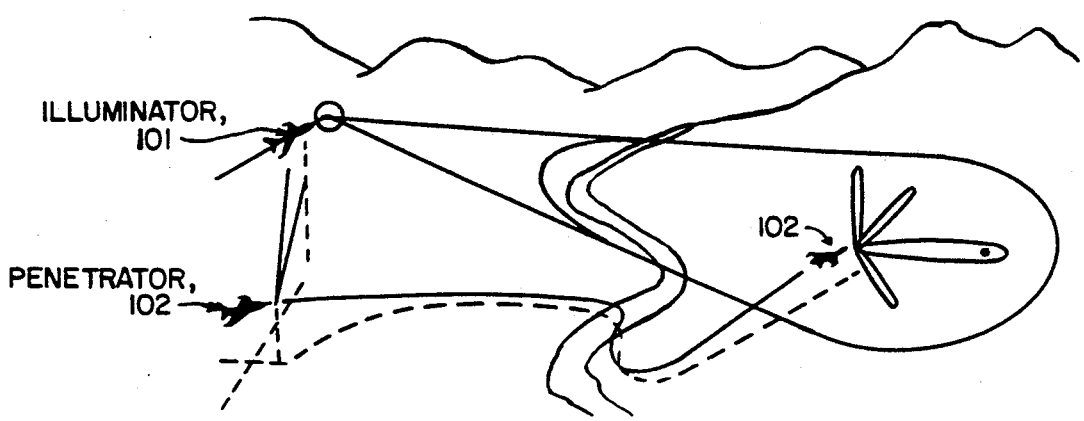
FIG. 1 is an illustration of the operation of a bistatic radar system which uses the present invention.

FIG. 1 is a sketch depicting the operation activities of an airborne bistatic radar system which uses the present invention. The principal elements employed in a tactical strike scenario are:

a stand-off illuminator aircraft 101 which flies in safe air space and provides illumination of an enemy ground area of interest; and a penetrating aircraft 102 that acquires targets and delivers weapons covertly by processing backscattered data generated from the bistatic illumination signal.

A critical function associated with this concept is the synchronization of processes in the illuminator and the penetrating aircraft. That is, processes for SAR imaging to facilitate target acquisition and processes for locating a target that has been acquired in bistatic radar coordinates are very sensitive to the synchronization of time reference in the illuminator and the penetrator and to the relative position and velocities of the two aircraft. This synchronization process is described in the form of a penetration time calibration step 701 of the process depicted in FIG. 2.

Figure 2:
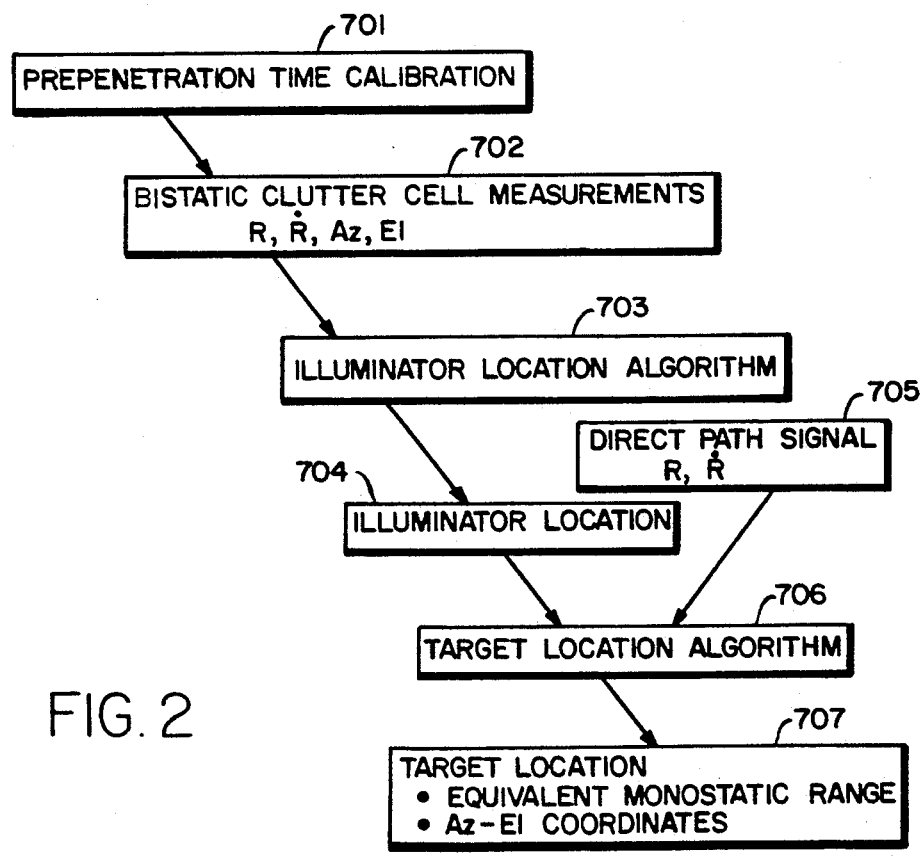
FIG. 2 is a block diagram of the steps of the target acquisition process.

FIG. 2 is a block diagram of the target acquisition process of an airborne bistatic radar system which uses the present invention. The process begins with the penetration time calibration step 701, which occurs at the beginning of a tactical strike scenario, when the penetrator aircraft 102 uses active radar to determine the range of the illuminator aircraft 101, and then calibrates the timing of the illumination signal emitted by the illuminator aircraft 101.

The proposed self-sync concept is predicated on a use of accurate frequency standards in both the illuminator and the penetrator such that Doppler frequency and propagation delays can be measured to desired accuracies. Accordingly, it is that measurements of time will not vary more than 0.05 used over a ½ hour period which imposes an accuracy requirement of about $3 \times 10^{-11}$. This accuracy appears to be achievable with modestly sized current technology atomic clocks.

Next, the penetrator aircraft 102 enters enemy territory, flying at low altitudes and operating only its bistatic radar present invention, as described below, the penetrator aircraft obtains the following clutter cell measurements on clutter cells ($C_1, C_2 \ldots C_n$):

Bistatic Range: $r_{c1} \, r_{c2} \ldots r_{cn}$
Bistatic Range Rate: $\dot{r}_{c1} \, \dot{r}_{c2} \ldots \dot{r}_{cn}$
Azimith: $\theta_{c1}, \theta_{c2} \ldots \theta_{cn}$
Elevation: $\phi_{c1}, \phi_{c2} \ldots \phi_{cn}$ If the receiver aircraft is operating in mode 3, it will accomplish the bistatic clutter cell measurement step 702, 1 described above, simultaneously with step 705, in which it receives the following direct path measurements:

Range: $r_d$
Range Rate: $\dot{r}_d$

The measurement of $r_d$ and $\dot{r}_d$ refer respectively to the range and range rate of the illuminator aircraft 101 with respect to the receiver aircraft 102.

Next the Illuminator Locator Algorithm, of the present invention, is applied in step 703 and the state of the illuminator is determined 704.

The position and velocity of the illuminator can be defined in terms of 6 unknowns (3 coordinate position and 3 velocity). If the direct path is measured, the list of unknowns is reduced from 6 to 4 since the direct path propagation delay yields the range magnitude and a Doppler measure yields the radial component of velocity.

The application of the illuminator locator algorithm, of the present invention, determines the location of the illuminator aircraft 101 using either: just the ground clutter echo returns or the clutter returns plus the direct path data measurements, 705.

Once the illuminator state (position and velocity) is known, the radar receiver of the penetrator is then able to determine the location of the target (steps 706 and 707) from the echo returns. If the tactical strike scenario is operating in mode 2, the penetrator aircraft will "pop up" to a sufficient altitude to obtain direct path reference data during terminal targeting only. This "pop up" maneuver allows the penetrator aircraft 102 to refine its estimate of the position and bearing of the illuminator aircraft 101. If the tactical strike scenario is mode 1, with no direct path used throughout the mission, the target parameters are made using just the bistatic echo returns. If direct path data is used, the target location is made with an equivalent monostatic range computed.

A ground rule assumed in the self sync concept is that both the illuminator and penetrator would have high quality inertial navigators that could be used for motion compensation, and in the case of the penetrator, to provide a local coordinate frame reference for target location as well as providing input of target position and velocity in a geodetic coordinate system.

Figure 3:
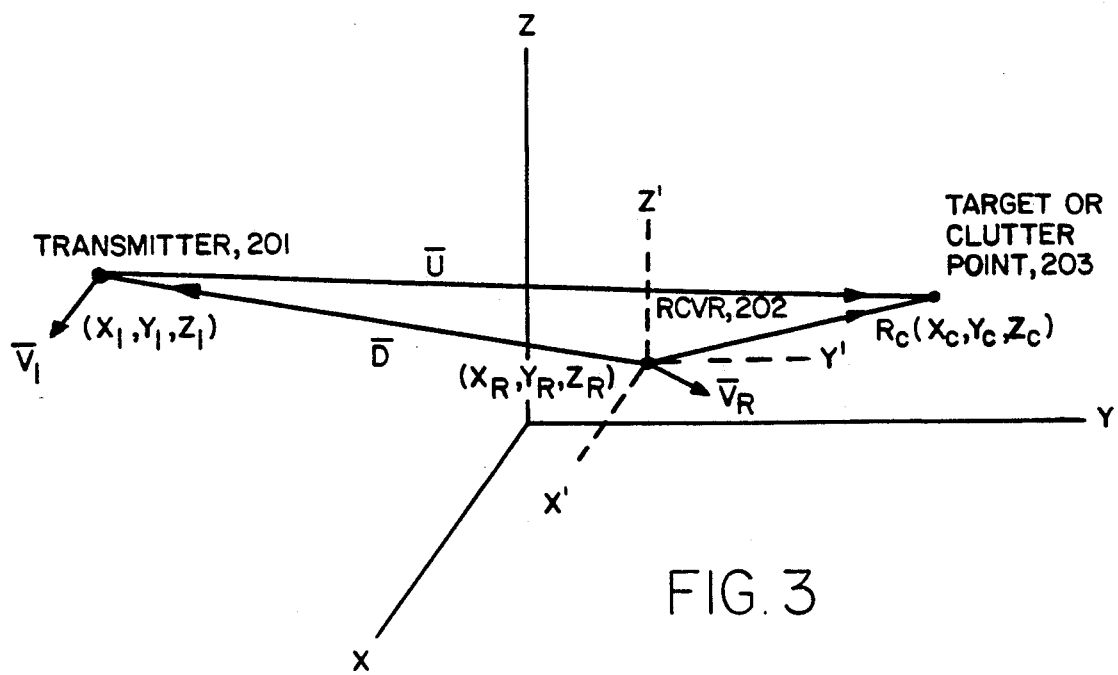
FIG. 3 is an illustration depicting the bistatic radar coordinate system.

The bistatic radar coordinate systems are shown in FIG. 3, the (X,Y,Z) coordinate system is centered inertially and the X',Y',Z') coordinate system is referenced to the receiver. The range of the target with respect to the receiver is computed as a function of the bistatic geometry parameters which are known or measured by the radar.

The target range sum is defined as:

$$R_S = U + R \tag{1}$$

where:
R = vector directed from the receiver to the clutter cell; and
U = vector directed from the transmitter to the clutter cell; and
(X,Y,Z) = inertial coordinate system centered in space;
(X',Y',Z') = coordinate system centered at the receiver;
$(X_1, Y_1, Z_1)$ = transmitter coordinates in X,Y,Z space;
$(X_R, Y_R, Z_R)$ = receiver coordinates in X,Y,Z space;
$(X_c, Y_c, Z_c)$ = target or clutter coordinates in X,Y,Z space;
$\bar{V}_J$ = velocity vector of transmitter in X,Y,Z space;
$\bar{V}_R$ = velocity vector of receiver in X,Y,Z space;
$i_{RC}$ = unit vector in direction of $R_c$;
$i_D$ = unit vector in direction of D;

$(\theta'_{ci}, \phi'_{ci})$ 32 azimuth and elevation angles to the clutter cell measured in X',Y',Z' space and;
$(\theta_{ci}, \phi_{ci})$ = azimuth and elevation angles to the clutter cell measured in X,Y,Z space.

The target range difference (W) is defined as:

$$W = U + R - D \tag{2}$$

where D = the vector directed from the receiver to the transmitter.

From equation 1, it can be seen that:

$$U^2 = (R - R_S)^2 \tag{3}$$

But $$\begin{aligned} U^2 &= (\bar{D} - \bar{R}) \cdot (\bar{D} - \bar{R}) \\ &= (D\bar{i}_D - R\bar{i}_R) \cdot (D\bar{i}_D - R\bar{i}_R) \\ &= D^2 + R^2 - 2RD\bar{i}_R \cdot \bar{i}_D \end{aligned}$$

Therefore $$(R - R_S)^2 = R^2 - 2R_S R + R_S^2$$

$$(R - R_S)^2 = D^2 + R^2 - 2RD\bar{i}_R \cdot \bar{i}_D \tag{4}$$

The range to the target can then be expressed as $$R = \frac{1}{2} \frac{R_s^2 - D^2}{R_s - D(\bar{i}_R \cdot \bar{i}_D)} \tag{5}$$

or equivalently $$R = \frac{1}{2} \frac{W^2 + 2WD}{W + D - D(\bar{i}_R \cdot \bar{i}_D)} \tag{6}$$

where $W = R_S - D = U + R - D$, target bistatic differential range.

The vector dot product can be expressed as $$(\bar{i}_R \cdot \bar{i}_D) = \frac{1}{RD}(X_T \bar{i}_x + Y_T \bar{i}_y + Z_T \bar{i}_z) \cdot (X_J \bar{i}_x + Y_J \bar{i}_y + Z_J \bar{i}_z) \tag{7}$$

where $$X_{T'} = R \cos \phi_{T'} \cos \theta_{T'} \tag{7A}$$

$$Y_{T'} = R \cos \phi_{T'} \sin \theta_{T'} \tag{7B}$$

$$Z_{T'} = R \sin \phi_{T'} \tag{7C}$$

and $$S_{J'} = D \cos \phi_{J'} \cos \theta_{J'}$$

$$Y_{J'} = D \cos \phi_{J'} \sin \theta_{J'}$$

$$Z_{J'} = D \sin \phi_{J'}$$

But substituting these expressions into the previous equation, $$\begin{aligned} (i_R \cdot i_D) &= \cos\phi_{T'}\cos\theta_{T'}\cos\phi_{J'}\cos\theta_{J'} + \cos\phi_{T'}\sin\theta_{T'} + \\ &\quad \cos\phi_{J'}\sin\theta_{J'} + \sin\phi_{T'}\sin\phi_{J'} \\ &= \cos\phi_{T'}\cos\phi_{J'}(\cos\theta_{T'}\cos\theta_{J'} + \sin\theta_{T'}\sin\theta_{J'}) + \\ &\quad \sin\phi_{T'}\sin\phi_{J'} \\ &= \cos\phi_{T'}\cos\phi_{J'}\cos(\theta_{J'} - \theta_{T'}) + \sin\phi_{T'} + \sin\phi_{J'} \end{aligned} \tag{8}$$

The target and azimuth angles, $\phi_T'$ and $\theta_T'$, are measured by the bistatic receiver in a manner similar to that of monostatic radars. Thus, by measuring the target elevation and azimuth angle, the illuminator parameters D, $\phi'_I$, $\theta'_I$, and the target range sum, $R_S$ or (or equivalently bistatic differential range, W,), the target can be uniquely located with respect to the receiver.

As mentioned in the discussion of FIG. 1, the tactical strike scenario begins by calibrating the timing of the illumination signals from the illuminator. Therefore, the receiver always "knows" when signals were transmitted from the illuminator, and can determine the amount of distances the illumination signal must have traveled by observing when the signals were received.

There exists equations to process clutter data for a flat earth assumption which are implemented by measuring the azimuth and elevation angles and the bistatic range and Doppler to a set of clutter cells. By assuming that the terrain was flat and the receiver altitude known, the data could be processed to locate the illuminator aircraft. The clutter range data could either consist of range sum data, where the transmitter timing was synchronized with the receiver, or the differential range measured relative to a direct path timing reference. A Sum ($\Sigma$) filter and a Difference ($\Delta$) filter can accommodate these two forms of clutter range data.

The transformation which maps the transmitter and receiver aircraft velocities and ranges into the bistatic radar data measured from the clutter is given by equation 1:

$$R_S = R + U \quad (9)$$
$$= [(X_{ci} - X_R)^2 + (Y_{ci} - Y_R)^2 + (Z_{ci} - Z_R)^2]^{\frac{1}{2}} +$$
$$[(X_{ci} - X_I)^2 + (Y_{ci} - Y_I)^2 + (Z_{ci} - Z_I)^2]^{\frac{1}{2}}$$

$$\bar{\dot{R}}_S = \bar{V}_I \cdot \bar{i}_U + \bar{V}_R \cdot \bar{i}_R \quad (10)$$
$$= \frac{1}{U} [(X_{ci} - X_I)\dot{X}_I + (Y_{ci} - Y_I)\dot{Y}_I + (Z_{ci} - Z_I)\dot{Z}_I] +$$
$$\frac{1}{R} [(X_{ci} - X_R)\dot{X}_R + (Y_{ci} - Y_R)\dot{Y}_R + (Z_{ci} - Z_R)\dot{Z}_R]$$

While the range sum is determined using the sum filter, a difference ($\Delta$) filter would use equation 2:

$$W = R + U - D \quad (11)$$
$$= [(X_{ci} - X_R)^2 + (Y_{ci} - Y_R)^2 +$$
$$(Z_{ci} - Z_R)^2]^{\frac{1}{2}} + [(X_{ci} - X_I)^2 + (Y_{ci} - Y_I)^2 +$$
$$(Z_{ci} - Z_I)^2]^{\frac{1}{2}} - [(X_I - X_R)^2 + (Y_I - Y_R)^2 +$$
$$(Z_I - Z_R)^2]^{\frac{1}{2}}$$

$$\dot{W} = \bar{V}_I \cdot i_U + \bar{V}_R \cdot i_R - (\bar{V}_I - \bar{V}_R) \cdot i_D \quad (11)$$

$$\dot{W} = \frac{1}{U} [(X_{ci} - X_I)\dot{X}_I + (Y_{ci} - Y_I)\dot{Y}_I + (Z_{ci} - Z_I)\dot{Z}_I] \quad (12)$$
$$\frac{1}{R} [(X_{ci} - X_R)\dot{X}_R + (Y_{ci} - Y_R)\dot{Y}_R +$$
$$(Z_{ci} - Z_R)\dot{Z}_R] +$$
$$\frac{1}{D} [(X_I - X_R)\dot{X}_R + (Y_I - Y_R)\dot{Y}_R +$$
$$(Z_I - Z_R)\dot{Z}_R] -$$
$$\frac{1}{D} [(X_I - X_R)\dot{X}_I + (Y_I - Y_R)\dot{Y}_I + (Z_I - Z_R)\dot{Z}_I]$$

where $(X_{ci}, Y_{ci}, Z_{ci})$ = range components of the ith clutter cell measured in XYZ coordinates $\left. \begin{array}{l} X_I, Y_I, Z_I \\ \dot{X}_I, \dot{Y}_I, \dot{Z}_I \end{array} \right\}$ = range and velocity components of the transmitter aircraft $\left. \begin{array}{l} X_R, Y_R, Z_R \\ \dot{X}_R, \dot{Y}_R, \dot{Z}_R \end{array} \right\}$ = range and velocity components of the receiver aircraft The X,Y,Z components of the transmitter aircraft position and velocity are to be derived from the data measured in this form from a number of clutter cells.

The known or measured quantities in these equations are:

Clutter cell location relative to the receiver aircraft, $(X_c, Y_c, Z_c)$ where
$X_{ci} = X'_{ci} + X_R$
$X_{ci} = Y'_{ci} + Y_R$
$Z_{ci} = Z'_{ci} + Z_R$
$(X'_{ci}, Y'_{ci}, Z'_{ci})$ = coordinates of the clutter cell relative to the receiver
$X'_{ci} = R_{ci} \cos \phi'_{ci} \cos \theta'_{ci}$
$Y'_{ci} = R_{ci} \cos \phi'_{ci} \sin \theta'_{ci}$
$Z'_{ci}$ = altitude of the receiver aircraft above the clutter terrain
$R_{ci} = Z'_{ci} (\sin \phi'_{ci})^{-1}$ If the terrain were assumed flat, the altitude of the aircraft known and the clutter elevation and azimuth angles measured, the X,Y,Z coordinates of each clutter cell could be determined by the above equations. Additionally, by assuming there is a flat terrain and measurements are made of the differential range sum, differential range sum rate, and the clutter coordinates, then a simple, linear Kalman filter can be employed to track an airborne illuminator, provided the observation vector is a linear function of the state vector. However, the directly measured quantities consists of $W^i$, $\dot{W}^i$, $X_C^i$, $Y_C^i$, $Z_C^i$ i=1,N, where N is the number of clutter cells, and these are not linearily related to the illuminator state vector. However, if these quantities are the input to a "maximum likelihood estimate" (MLE) filter whose output is an estimate of $X_I$, $Y_I$, $Z_I$, $\dot{X}_I \dot{Y}_I$, $\dot{Z}_I$, then this estimate can be used as the observation or measurement vector of a simple linear Kalman filter.

First, a MLE filter is used to give an estimate of $X_I$, $Y_I$, $Z_I$.

Consider the set of equations, $$W^i = R + U - D = [(X_c^i - X_R)^2 + (Y_c^i - Y_R)^2 + \quad (13)$$
$$(Z_c^i - Z_R)^2]^{\frac{1}{2}} + [(X_c^i - X_I)^2 + (Y_c^i - Y_I)^2 + (Z_c^i - Z_I)^2]^{\frac{1}{2}} -$$
$$[(X_I - X_R)^2 + (Y_I - Y_R)^2 + (Z_I - Z_R)^2]^{\frac{1}{2}}$$

Let:

$D_{cI}^i = [(X_c^i - X_I)^2 + (Y_c^i - Y_I)^2 + (Z_c^i - Z_I)^2]^{\frac{1}{2}}$ $D_{cR}^i = [(X_c^i - X_R)^2 + (Y_c^i - Y_R)^2 + (Z_c^i - Z_R)^2]^{\frac{1}{2}}$ $D_{IR} = [(X_R - X_I)^2 + (Y_R - Y_I)^2 + (Z_R - Z_I)^2]^{\frac{1}{2}}$ Then the goal is to find $X_I$, $Y_I$, $Z_I$ such that $$W^i = D_{CI}^j + D_{cR}^i - D_{IR} \equiv W^i(X_I, Y_I, Z_I) \quad (14)$$

Where
W$^i$ are measurements
W$^i$(X$_I$,Y$_I$,Z$_I$) is a function of X$_I$,Y$_I$,Z$_I$ and X$_c^i$, Y$_c^i$, Z$_c^i$, X$_R$, Y$_R$, Z$_R$
We wish to find a M.L. estimate of $$\begin{bmatrix} \hat{X}_I \\ \hat{Y}_I \\ \hat{Z}_I \end{bmatrix}$$

an iterative solution is $$\begin{bmatrix} \hat{X}_I \\ \hat{Y}_I \\ \hat{Z}_I \end{bmatrix}^{(k+1)} = \begin{bmatrix} \hat{X}_I \\ \hat{Y}_I \\ \hat{Z}_I \end{bmatrix}^k - [\overline{\nabla F}(\hat{X}_I, \hat{Y}_I, \hat{Z}_I)^k]^{-1} F(\hat{X}_I, \hat{Y}_I, \hat{Z}_I)^k$$

$$F = \begin{bmatrix} \Sigma_i \; \omega^i \; \frac{\partial W^i}{\partial X_I} \\ \Sigma_i \; \omega^i \; \frac{\partial W^i}{\partial Y_I} \\ \Sigma_i \; \omega^i \; \frac{\partial W^i}{\partial Z_I} \end{bmatrix} \quad \omega^i = \frac{W^i(X_I, Y_I, Z_I) - W^i}{\phi_{W^i}}$$

Where $\phi_{W^i}$ is the standard deviation of the measurement noise.

$$\nabla F = \begin{bmatrix} \nabla F_x \\ \nabla F_y \\ \nabla F_z \end{bmatrix} = \begin{bmatrix} F_{11} & F_{12} & F_{13} \\ F_{21} & F_{22} & F_{23} \\ F_{31} & F_{32} & F_{33} \end{bmatrix}$$

define $$F_1^i(\alpha(j)) = \frac{1}{\sqrt{\sigma_{W^i}}} \left[ \frac{\alpha(j) - X_c^i(j)}{D_{CI}^j} - \frac{(j) - X_R(j)}{D_{IR}} \right]; \text{ then} \quad (15)$$

$$F^i(d(j), \beta(k)) = \frac{1}{\sqrt{\sigma_{W^i}}} \left[ \frac{\alpha(j) - X_c^i(j))^2}{D_{CI}^j} - \frac{1}{D_{IR}} + \frac{(\alpha(j) - X_R(j))^2}{D_{IR}^3} \right] \text{ for } j = k; \text{ and} \quad (16)$$

$$F^i(d(j), \beta(k)) = \frac{1}{\sqrt{\sigma_{W^i}}} \left[ \frac{\alpha(j) - X_R(j))(\beta(k) - X_R(k))}{D_{IR}^3} - \frac{(\alpha(j) - X_c^i(j))(\beta(k) - X_c^i(k))}{D_{CI}^3} \right] j \neq k$$

$$A^i = D_{cR}^j + D_{cI}^j - D_{IR} - W^i \quad (17)$$

$$F(\alpha(j); \beta(k)) = \sum_i F_1^i(\alpha(j)) F_1^i(\beta(k)) + \sum_i A^i F^i(\alpha(j), \beta(k)) \quad (18)$$

where $X_c^i(1) = X_c^i X_c^i(2) = Y_c^i X_c^i(3) = Z_c^i$ $\alpha(1) = \beta(1) = X_I$ $\alpha(2) = \beta(2) = Y_I$ $\alpha(3) = \beta(3) = Z_I$ then $$F = \begin{bmatrix} F_1 \\ F_2 \\ F_3 \end{bmatrix} \text{ where } F_k = \sum_i \frac{A^i}{\sqrt{\sigma_{W^i}}} F_1^i(\alpha(k)) \quad (19)$$

$$\nabla F = [F_{kj}]$$

where $$F_{kj} = F((k); \beta(j))$$

Figure 4:
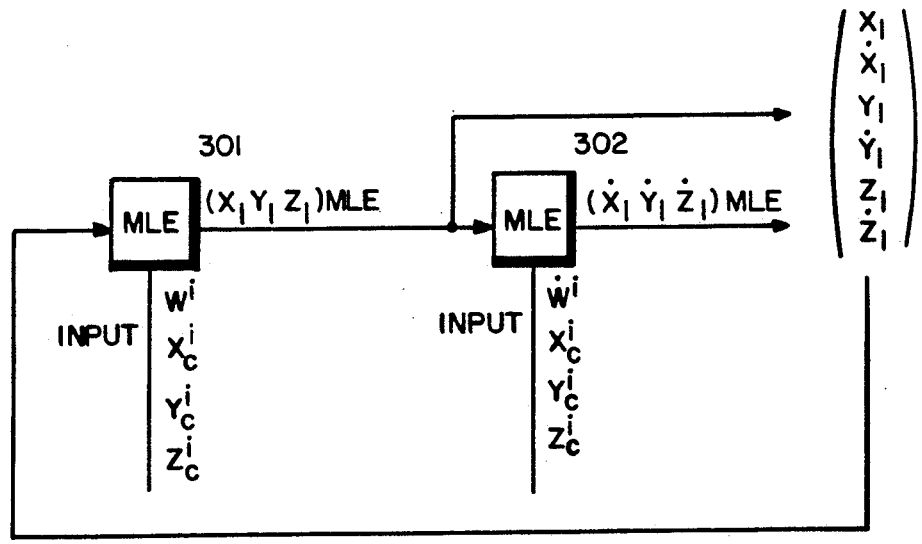
FIG. 4 is a sketch of a regular terrain bistatic radar synchronization system which uses cascaded maximum likelihood estimate (MLE) filters to estimate the illuminator state.

FIG. 4 is a simplified block diagram of one embodiment of the present invention which uses the clutter measurements of X$_c^i$, Y$_c^i$, Z$_c^i$, W$_i$ and Ẇ$_i$ to solve for the illuminator state of X$_I$,Y$_I$,Z$_I$ and Ẋ$_I$,Ẏ$_I$,Ż$_I$. The first MLE filter 301 uses the above equation to yield the illuminator position. The second MLE filter 302 is used to give an estimate of Ẋ$_I$,Ẏ$_I$,Ż$_I$ and depends upon the estimate of the illuminators position given by the first MLE filter. For sake of simplicity, denote the later estimate simply by X$_I$,Y$_I$,Z$_I$.

Define $$b^i = \dot{w}^i + \frac{1}{R^i} [(X_c^i - X_R)\dot{X}_R + (Y_c^i - Y_R)\dot{Y}_R + \quad (20)$$

$$(Z_c^i - Z_R)\dot{Z}_R] - \frac{1}{D} [(X_I - X_R)\dot{X}_R +$$

$$(Y_I - Y_R)\dot{Y}_R + (Z_I - Z_R)\dot{Z}_R] \quad (21)$$

$$A_{i1} = -\frac{1}{U^i}(X_c^i - X_I) - \frac{(X_I - X_R)}{D}$$

A$_{i2}$ and A$_{i3}$ are cyclical permutations of A$_{i1}$ in the variables X$_c^i$, X$_I$, X$_R$.

Let $$V_I = \begin{bmatrix} \dot{X}_I \\ \dot{Y}_I \\ \dot{Z}_I \end{bmatrix}$$

For N measurements, b and A are defined as:

$$b = \begin{bmatrix} b^1 \\ \cdot \\ \cdot \\ \cdot \\ b^N \end{bmatrix}$$

$A = [A_{ij}]\ j = 1,3.\ i = 1,N$

Then the goal is to find the MLE of $V_I$ based upon the measurement vector b, where:

$$b = AV_I + N$$

$$E(NN^T) = R$$

For Gaussian noise, the MLE is equivalent to minimizing the functional, $$J = (A\hat{V}_I - b)^T R^{-1}(A\hat{V}_I - b)$$

For simplicity, let $R = I$. Then we wish to find an estimate $V_I$ such that $$J = \left| |A\hat{V}_I - b| \right|^2$$

is minimum. This is a well known problem, and two methods of evaluating VI are given. A direct way would be to evaluate the pseudoinverse of $[A_{ij}]$ which yields:

$$\hat{V}_I - A^T b = (A^T A)^{-1} A^T b$$

In the present invention, an estimate of the state vector is formed by combining the last state estimate with small linear perturbations of the present data. The filtered state vector at state k, given k measurements, is given by $$\hat{X}_{k,k} = \hat{X}_{k,k-1} + G_k(Y_k - h(\hat{X}_{k,k-1}, Z_k)) \quad (22)$$

where $\hat{X}_{k,k-1} = \Phi(k, k-1)\hat{X}_{k-1,k-1}$, predicted value of the $k^{th}$ state given $k-1$ measurements $G_k = P_{k,k-1}H^T(R_k + H_k P_{k,k-1} H^T)^{-1}$, filter gain matrix $h(\hat{X}_{k,k-1}, Z_k) =$ nonlinear transformation evaluated at $\hat{X}_{k,k-1}, Z_k$ $\Phi(k,k-1) =$ state transition matrix from state $k-1$ to state k $P_{k,k-1} = \Phi(k,k-1)P_{k-1,k-1}\Phi^T(k,k-1) + Q_{k,k-1}$, predicted covariance matrix $R_k =$ data noise covariance matrix $Q_{k,k311} =$ deweighting matrix $Y_k =$ filter data matrix for the $k^{th}$ sample $$H_k = \left. \frac{\partial h}{\partial x} \right|_{\hat{X}_{k,k-1}, Z_k}, \text{Jacobian matrix evaluated at } \hat{X}_{k,k-1}, Z_k$$

$Z_k =$ clutter position data and receiver position and velocity data for the $k^{th}$ sample The Jacobian matrix $H_k$, is evaluated at each filter iteration as a function of the data, $Z_k$, and the previous state estimate $\hat{x}_{k,k-1}$. Therefore, the filter gain terms, $G_k$, must be computed at each iteration of the filter and cannot be precomputed as they can be for a linear filter. The number of real-time arithmetic operations for this type of filter can become quite large for a large data set.

Note that the receiver range and velocity vector components $(\dot{X}_R, \dot{Y}_R, \dot{Z}_R)$ and $(X_R, Y_R, Z_R)$ are available from the INS.

If enough independent samples of the clutter bistatic range and doppler data ($R_s$ and $\dot{R}_s$ or W and $\dot{W}$) are taken, the nonlinear equations can be solved for:

the transmitter aircraft location in inertial coordinates $(X_I, Y_I, Z_I)$;

and the transmitter aircraft velocity vector components $(\dot{X}_I, \dot{Y}_I, \dot{Z}_I)$.

Figure 6:
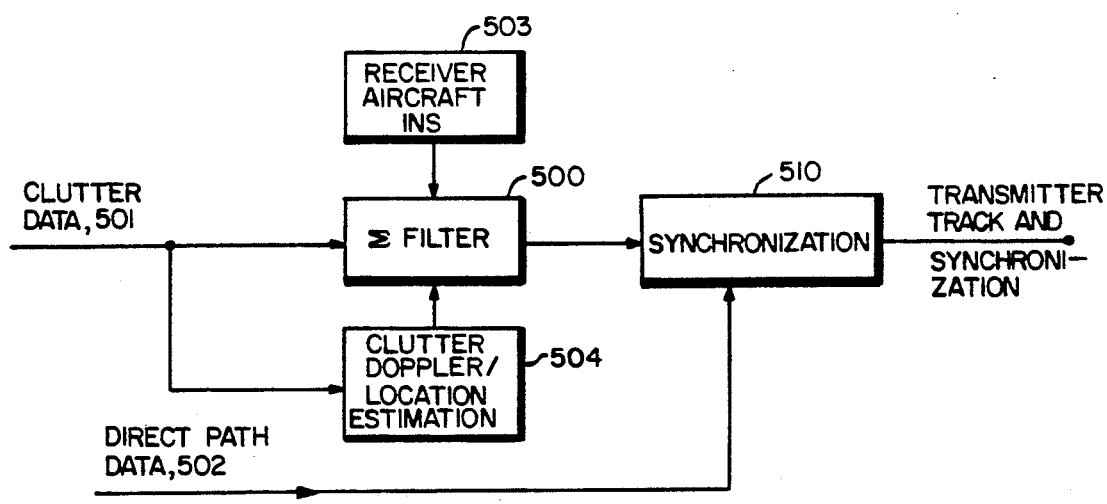
FIGS. 6 and 7 are both block diagrams of embodiments of bistatic radar synchronization systems of the present invention.
Figure 7:
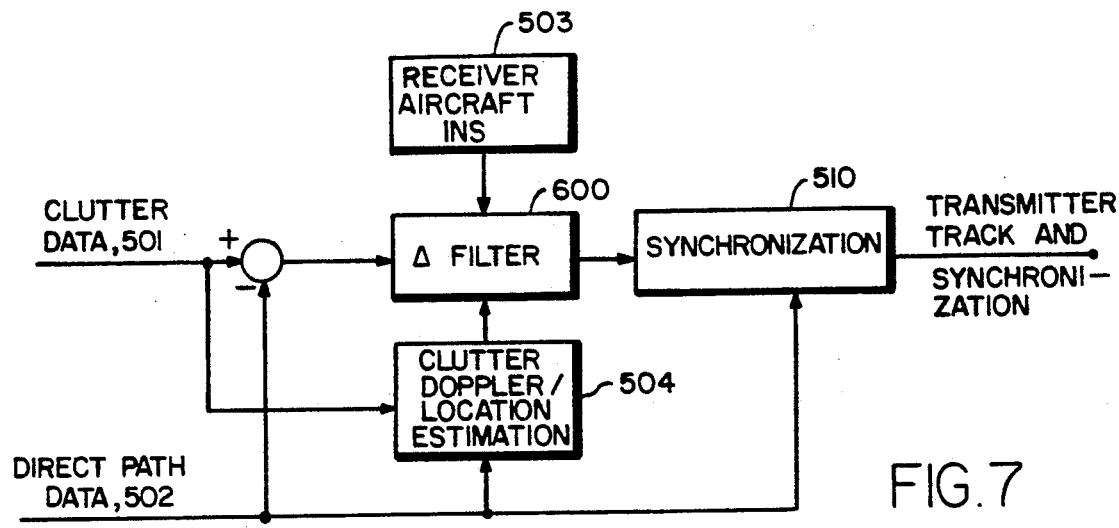

The apparatus and method of the present invention includes an improvement upon the technique disclosed above in that it, in the embodiments of FIGS. 6 and 7, do not require a flat earth assumption in order to determine the illuminator state. This allows the operation of the bistatic radar in completely unknown terrain conditions without a direct path signal.

The nonlinear equations relating the measured bistatic range and range rate of the clutter cells to the positional and velocity data of the transmitter aircraft can be solved by a number of different methods. Since the form of the equations does not lend itself to a closed-form solution of the illuminator aircraft flight parameters, an iterative method must be used. Sufficient geometrically diverse clutter data must be taken during a receiver antenna scan to effect a solution. Additionally, a sufficient number of clutter cells must be sampled in order to determine the six unknowns of the illuminator's state. As mentioned earlier, the position and velocity of the illuminator can be defined in terms of 6 unknowns (3 coordinate position and 3 velocity). If the direct path is measured, the list of unknowns is reduced from 6 to 4 since the direct path propagation delay yields the range magnitude and a doppler measure yields the radial component of velocity.

While four measurements are derived from a given ground clutter path (range, range rate, azimuth and elevation) only range and doppler measurements contribute directly to illuminator position-velocity solutions. Moreover, each measurement on a clutter path introduces an additional unknown to the measurements system since the equivalent monostatic range to the clutter patch in the system is unknown. Thus, each clutter measurement system yields 1 useful "degree of freedom" toward a solution to the measurement system unknowns. Accordingly, without a direct path measurement a unique determination of illuminator position and velocity requires at least 6 clutter path measurements. Similarly, 4 clutter path measurements are required for a solution if direct path measurements are included.

Figure 5:
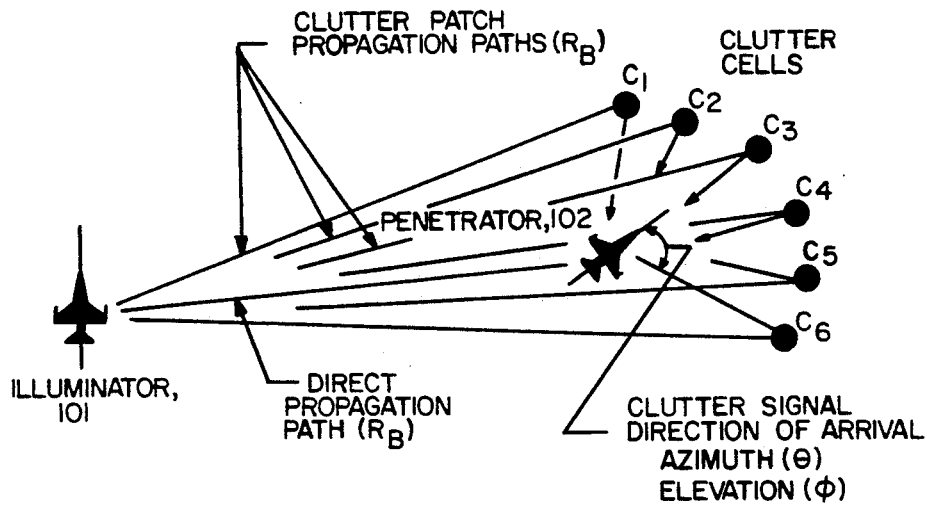
FIG. 5 is a sketch of the clutter cell measurement concept of the present invention.

FIG. 5 is a sketch of the clutter cell measurement concept of the present invention. As shown, the penetrator aircraft 102, receives six clutter cell echo returns $C_1$-$C_6$ from the radar signal transmitted by the illuminator 101.

If the bistatic range and doppler and elevation azimuth should be a sufficient amount of information to derive the position and velocity components of the illuminator aircraft without requiring any assumptions about the clutter terrain. For example, assume that there are $N_c$ number of clutter cells measured per scan and that the number of range and doppler data measurements equals $2N_c$. The number of independent (assume disjoint clutter cells) equations and number of unknowns for both the flat and irregular terrain conditions are given as:

Number of unknown illuminator variables = 6
$(X_I, Y_I, Z_I), (\dot{X}_I, \dot{Y}_I, \dot{Z}_I)$
Number of unknown clutter cell ranges
Flat earth = 0
Irregular terrain = $N_c$

TABLE 1

| No. Cells (Nc) | No. Equations ($2N_c$) | No. Unknowns Flat Earth (6) | No. Unknowns Irregular Terrain ($N_c$ + 6) |
|---|---|---|---|
| 5 | 10 | 6 | 11 |
| 10 | 20 | 6 | 16 |
| 20 | 40 | 6 | 26 |

The difference between the flat earth and the irregular terrain processing is that the range to each clutter cell from the receiver is unknown for the irregular terrain condition. Therefore, one unknown (the clutter cell range) is added for each irregular terrain clutter cell measured. Since the clutter cell bistatic range and doppler are measured (forming two equations per cell), the number of equations equals to or exceeds the number of unknowns when $$N_c + 6 \leq 2N_c$$

or when $$N_c \geq 6$$

This assumes that no other data is measured regarding the illuminator's position (the processing of the clutter data augmented by illuminator position measurements is considered later). Therefore, it should be theoretically possible to solve the nonlinear equations for the six unknown illuminator variables if the number of geometrically diverse clutter cells equals to or exceeds six.

The previous arguments reveal that the processing of the bistatic irregular clutter data to locate the illuminator will work only if doppler is measured (coherent waveforms) and at least one of the bistatic radar elements (receiver or transmitter) is moving relative to the terrain. The flat terrain formulations would be used for any other condition (noncoherent waveforms and/or stationary bistatic radar elements).

The measurements that are used to determine illuminator location are illustrated in FIG. 5 and summarized in table 2. A series of measurements are performed via a scanning antenna beam, or alternatively as a parallel operation using a multiplexed phase steered antenna, such that bistatic range, doppler, azimuth, and elevation angles are measured on a set of clutter patches in the vicinity of the penetrator. These measurements are performed repeatedly over a period of time with the time sequential measurements processed through an appropriate algorithm to derive an optimized estimate of the illuminator location. Prior to a pop-up, these measurements do not involve the direct path. However, when pop-up occurs, the direct path measurement can be factored into the final illuminator position and velocity estimates.

TABLE 2

| Measurements on Clutter Cells ($C_1, C_2 \ldots C_n$) | |
|---|---|
| Bistatic Range | $r_{c1}, r_{c2} \ldots r_{cn}$ |
| Bistatic Range Rate | $\dot{r}_{c1}, \dot{r}_{c2} \ldots \dot{r}_{cn}$ |
| Azimuth DOA | $\theta_{c1}, \theta_{c2} \ldots \theta_{cn}$ |
| Elevation DOA | $\phi_{c1}, \phi_{c2} \ldots \phi_{cn}$ |
| Direct Path Measurement | |
| Range | $r_d$ |
| Range Rate | $\dot{r}_d$ |

When the penetrator pop-ups for target acquisition, the estimates of illuminator position and velocity as described above are used for the bistatic SAR imaging process. The target is then designated by the operator and an equivalent monostatic range is computed for weapon delivery based on the bistatic range/doppler components of the target signal, associated azimuth and elevation angles as derived from monopulse measurements on the bistatic signal, and a measurement of the direct path range and doppler.

The technique by which the irregular terrain clutter data is processed to determine the illuminator aircraft position and velocity components is similar in concept to that given earlier for flat terrain conditions. A nonlinear Kalman filter is used on the bistatic radar clutter data and an illuminator aircraft state vector updated after the batch processing of the data from a number of cells. However, this technique departs from the other by eliminating the unknown monostatic range to each clutter cell and operating only on the bistatic doppler data.

The elevation and azimuth angles to the clutter cell can be measured by the system but the range of the cell with respect to the receiver is unknown for irregular terrain. When the terrain is flat, the range can be computed from knowledge of the altitude of the receiver aircraft and the elevation angle of the clutter cell. The clutter cell range will be eliminated by appropriately combining the measured clutter range data and operating on the doppler data. The monostatic range to the $i^{th}$ clutter cell can be expressed from the bistatic geometry transformation given earlier as $$R_{ci} = \frac{1}{2} \frac{R_{si}^2 - D^2}{R_{si} - D(\vec{1}_{Rci} \cdot \vec{1}_D)}$$

$$= \frac{1}{2} \frac{W_i^2 + 2W_i D}{W_i + D - D(\vec{1}_{Rci} \cdot \vec{1}_D)}$$

where
$R_{si}$ = range sum of the $i^{th}$ clutter cell
$W_i$ = bistatic differential range of the $i^{th}$ clutter cell $$\vec{1}_{Rci} \cdot \vec{1}_D = \cos\phi_{ci}' \cos\phi_I' \cos(\phi_I' - \theta_{ci}') + \sin\phi_{ci}' \sin\phi_I'$$

by using the following identities, $$X_I' = D\cos\phi_I' \cos\theta_I' = X_I - X_R$$

$$Y_I' = D\cos\phi_I' \sin\theta_I' = Y_I - Y_R$$

$$Z_I' = D\sin\phi_I' = Z_I - Z_R$$

$$X_{ci}' = R_{ci}\cos\phi_{ci}' \cos\theta_{ci}' = X_{ci} - X_R$$

$$Y_{ci}' = R_{ci}\cos\phi_{ci}' \cos\theta_{ci}' = Y_{ci} - Y_R$$

-continued $$Z_{ci} = R_{ci} \sin \phi_{ci}' = Z_{ci} - Z_R$$

$$\cos(\theta_I' - \theta_{ci}') = \cos\theta_I' \cos\theta_{ci}' + \sin\theta_I' \sin\theta_{ci}'.$$

the monostatic range to the $i^{th}$ clutter cell can be expressed as $$R_{ci} = \frac{1}{2} \frac{R_{si}^2 - D^2}{R_{si} - (X_I - X_R)\cos\phi_{ci}'\cos\theta_{ci}' - (Y_I - Y_R)\cos\phi_{ci}'\sin\theta_{ci}' - (Z_I - Z_R)\sin\phi_{ci}'}$$

$$= \frac{1}{2} \frac{W_i^2 + 2 W_i D}{W_i + D - (X_I - X_R)\cos\phi_{ci}'\cos\theta_{ci}' - (Y_I - Y_R)\cos\phi_{ci}'\sin\theta_{ci}' - (Z_I - Z_R)\sin\phi_{ci}'}$$

where $$D = [(X_I - X_R)^2 + (Y_I - Y_R)^2 + (Z_I - Z_R)^2]^{\frac{1}{2}}$$

The input data to the nonlinear filter consists of the measured doppler data which can be expressed as a function of: 1) the measured clutter cell quantities, 2) the derived monostatic clutter cell range, 3) the illuminator state variables, and 4) the known receiver coordinates as:

$$\dot{R}_{si} = \overline{V}_I \cdot \overline{I}_{U_{ci}} + \overline{V}_R \cdot \overline{I}_{R_{ci}}$$

$$= \frac{1}{U_{ci}} [(X_{ci} - X_I)\dot{X}_I + (Y_{ci} - Y_I)\dot{Y}_I + (Z_{ci} - Z_I)\dot{Z}_I] +$$

$$\frac{1}{R_{ci}} [(X_{ci} - X_R)\dot{X}_R + (Y_{ci} - Y_R)\dot{Y}_R + (Z_{ci} - Z_R)\dot{Z}_R]$$

$$\dot{W}_i = \overline{V}_I \cdot \overline{I}_{U_{ci}} + \overline{V}_R \cdot \overline{I}_R - (\overline{V}_I - \overline{V}_R) \cdot \overline{I}_D$$

$$= \frac{1}{U_{ci}} [(X_{ci} - X_I)\dot{X}_I + (Y_{ci} - Y_I)\dot{Y}_I + (Z_{ci} - Z_I)\dot{Z}_I] +$$

$$\frac{1}{R_{ci}} [(X_{ci} - X_R)\dot{X}_R + (Y_{ci} - Y_R)\dot{Y}_R + (Z_{ci} - Z_R)\dot{Z}_R] +$$

$$\frac{1}{D} [(X_I - X_R)\dot{X}_R + (Y_I - Y_R)\dot{Y}_R + (Z_I - Z_R)\dot{Z}_R] -$$

$$\frac{1}{D} [(X_I - X_R)\dot{X}_I + (Y_I - Y_R)\dot{Y}_I + (Z_I - Z_R)\dot{Z}_I]$$

where $$X_{ci} = X_{ci}' + X_R = R_{ci} \cos\phi_{ci}' \cos\theta_{ci}'$$

$$Y_{ci} = Y_{ci}' + Y_R = R_{ci} \cos\phi_{ci}' \sin\theta_{ci}'$$

$$Z_{ci} = Z_{ci}' + Z_R = R_{ci} \sin\theta_{ci}'$$

$R_{ci}$ = monostatic range of the $i^{th}$ clutter cell determined from previous equations $(X_I, Y_I, Z_I)$
$(\dot{X}_I, \dot{Y}_I, \dot{Z}_I)$ } = illuminator aircraft state variables $\phi_{ci}', \theta_{ci}'$ = elevation and azimuth angles of the $i^{th}$ clutter cell measured with respect to the receiver $(X_R, Y_R, Z_R)$
$(\dot{X}_R, \dot{Y}_R, \dot{Z}_R)$ } = receiver aircraft position and velocity components measured by the receiver aircraft INS Note that the clutter bistatic doppler which forms the input to the filter is expressed in terms of the measured quantities and the illuminator position and velocity coordinates (state). Thus, if a sufficient number of clutter cells is taken, an over-determined set of equations relating the measurement data to the illuminator state will result. The illuminator state can be then estimated by nonlinear filtering or iterative methods.

FIGS. 6 and 7 are two embodiments of the present invention which serve to obtain transmitter track and synchronization in regular and irregular terrain. The embodiment of FIG. 6 uses a Sum ($\Sigma$) filter 500, which operates on the bistatic range sum data from the clutter cells as derived from Equation 1: $R_s = U + R$. The embodiment of FIG. 7 uses a Difference ($\Delta$) filter 600 which uses the target range difference data from the clutter cells as derived from Equation 2: $W = U + R - D$.

In both FIGS. 6 and 7, the inputs into the invention comprise: the clutter data 501, which contains the measurements of ($r_{ci}, \dot{r}_{ci}, \phi_{ci}$ and $\theta_{ci}$ for each clutter cell; and the direct path data 502, which, if available, contains $r_d$ and $\dot{r}_d$ as defined earlier and measured by the radar receiver of the penetrator aircraft. Note that in FIG. 7 Equation 2 is implemented by the summing junction 601, which serves to subtract D (measured as $r_d$ in the direct path data 502) from $R_s$ (which is provided by the clutter data measurements 501).

In both FIGS. 6 and 7, the receiver aircraft Inertial Navigation System (INS) 503 provides constant filter inputs of $X_R, Y_R, Z_R$, and $\dot{X}_R, \dot{Y}_R, \dot{Z}_R$ (the position and velocity components of the receiver aircraft.

When using the bistatic radar synchronization systems of either FIG. 6 or FIG. 7, the major differences in processing echo return signals between regular terrain and irregular terrain conditions is: both the bistatic range and doppler of the clutter cells are used as inputs when the filters of FIGS. 6 and 7 are operated as regular terrain filters, while only doppler data is used when they are operated as irregular terrain filters.

Both filters 500 and 600 of FIGS. 6 and 7 are provided with information from the clutter doppler/location estimation unit 504 with the following distinction. The sum filter 500 of FIG. 5 receives the clutter point target range sum data (denoted as $R_{si}$) from the bistatic radar receiver of the penetrator aircraft, and does not need direct path data to determine the illuminator state. The clutter doppler information provided by the clutter/doppler location estimation unit 504 to the sum filter 500 is the clutter point target range sum rate (the rate of change is the clutter point target range sum).

The difference filter 600 of FIG. 7 receives the clutter point target range difference $W_i$, which equals the target range sum $R_{si}$ minus the direct path range R (between the illuminator and the aircraft). The summing junction 601 of FIG. 7 performs the subtraction described above. In a similar manner, the clutter doppler/-location estimation unit 504 of FIG. 7 subtracts the direct path rate (obtained in the direct path data 502), from the target range sum rate to yield the target range difference rate $\dot{W}_i$, which is sent to the difference filter 600.

In using either of the bistatic radar synchronization systems of FIG. 6 or FIG. 7, note that data from a number of clutter cells is taken at each azimuth scan of the receiver antenna and, assuming that the geometry has not changed significantly over the scan or data collection period, the data is batch processed in the filter. Repetitive batches of clutter data are sequentially filtered to form an estimate of the transmitter aircraft state vector. Enough clutter cells are used for each batch to ensure convergence.

The data from the clutter cells 501, after modification to eliminate the unknown monostatic range components, can be expressed in matrix form as $$Y_k = Y_k + N_k, (N_c \times 1) \text{ matrix}$$

where $$Y_k = \begin{bmatrix} \dot{R}_{s1} \\ \dot{R}_{s2} \\ \cdot \\ \cdot \\ \dot{R}_{sN_c} \end{bmatrix}_k, N_k = \begin{bmatrix} N\dot{R}_{s1} \\ N\dot{R}_{s2} \\ \cdot \\ \cdot \\ N\dot{R}_{sN_c} \end{bmatrix}_k$$

$N_c$ = number of clutter cells used during the scan
$k$ = scan or filter sample number
$\dot{R}_{si}$ = range sum rate of the $i^{th}$ clutter cell $N\dot{R}_{si}$ = measurement error for the $i^{th}$ clutter cell $Y_k$ = true data
$Y'_k$ = measurement data The above modification is performed by the clutter doppler/location estimator unit if the embodiments of FIGS. 6 and 7 are operating for irregular terrain. Of course, both embodiments are capable of also operating for flat terrain in much the same manner as described for the embodiment of FIG. 3: first, an estimate of the state vector is formed by combining the last state estimate with small linear perturbations of the present data. The filtered state vector at state k, given k measurements, is given by Equation 22, defined earlier as:

$$\hat{X}_{k,k} = \hat{X}_{k,k-1} + G_k(Y_k - h(\hat{X}_{k,k-1}, Z_k)) \quad (22)$$

where $\hat{X}_{k,k-1} = \Phi(k,k-1)\hat{X}_{k-1,k-1}$, predicted value of the kth state given k−1 measurements
$G_k = P_{k,k-1}H_k^T(R_k + H_k P_{k,k-1} H_k^T)^{-1}$, filter gain matrix
$h(\hat{X}_{k,k-1}, Z_k)$ = nonlinear transformation evaluated at $\hat{X}_{k,k-1}, Z_k$
$\Phi(k,i-1)$ = state transition matrix from state k−1 to state k
$P_{k,k-1} = \Phi(k,k-1)P_{k-1,k-1} \Phi^T(k,k-1) + Q_{k,k-1}$, predicted covariance matrix
$R_k$ = data noise covariance matrix
$Q_{k,k-1}$ = deweighting matrix
$Y_k$ = filter data matrix for the $k^{th}$ sample $$H_k = \frac{\partial h}{\partial x} \bigg|_{\hat{X}_{k,k-1}, Z_k}$$

Jacobian matrix evaluated at $\hat{X}_{k,k-1}, Z_k$
$Z_k$ = clutter position data and receiver position and velocity data for the $k^{th}$ sample The data from the clutter cells can be represented in matrix form as $$Y_k' = Y_k + N_k, (2N_C \times 1) \text{ matrix} = \begin{bmatrix} Y_1 \\ Y_2 \\ \cdot \\ \cdot \\ Y_{NC} \end{bmatrix}_k - \begin{bmatrix} N_1 \\ N_2 \\ \cdot \\ \cdot \\ N_{NC} \end{bmatrix}_k \quad (23)$$

where:

$$Y_{ik} = \begin{bmatrix} R_{si} \\ \dot{R}_{si} \end{bmatrix}_k, N_{ik} = \begin{bmatrix} N_{R_{si}} \\ N_{\dot{R}_{si}} \end{bmatrix}_k, \text{ for the } \Sigma \text{ filter, 500} \quad (23a)$$

$$Y_{ik} = \begin{bmatrix} W_i \\ \dot{W}_i \end{bmatrix}_k, N_{ik} = \begin{bmatrix} N_{W_i} \\ N_{\dot{W}_i} \end{bmatrix}_k, \text{ for the } \Sigma \text{ filter, 600} \quad (23b)$$

$N_C$ = number of clutter cells used during the scan
$i$ = clutter cell number
$k$ = scan or filter sample number
$R_{si}, \dot{R}_{si}$ = range sum and range sum rate of the $i^{th}$ clutter cell
$W_i, \dot{W}_i$ = differential bistatic range and range rate of the $i^{th}$ clutter cell
$Y_k$ = true data
$Y_k'$ = measured data
$N_{R_{si}}, N_{\dot{R}_{si}}, N_{W_i}, N_{\dot{W}_i}$ = appropriately defined noise terms A specific number of clutter cells, $N_C$, are used in a batch mode at each filter iteration. If too few clutter cells are used, there will not be enough independent samples to allow convergence to a solution of the illuminator aircraft positional parameters.

The measurement noise for the $k^{th}$ filter sample, $N_k$, represents the uncertainty in that measurement of the clutter data. If it is assumed that the individual measurement errors have zero means and are independent from one another from sample to sample. The data error covariance matrix is of diagonal form as $$R_k = E[N_k N_k^T] \quad (24)$$

$$= \begin{bmatrix} \sigma_1^2 & & & 0 \\ & \sigma_2^2 & & \\ & & \cdot & \\ 0 & & & \sigma_{N_C}^2 \end{bmatrix}_k, (2N_c \times 2N_c) \text{ matrix}$$

where $$\sigma_{ik}^2 = \begin{bmatrix} \sigma_{N_{R_{si}}}^2 & 0 \\ & \cdot \\ 0 & \sigma_{N_{\dot{R}_{si}}}^2 \end{bmatrix}_k, \text{ for the } \Sigma \text{ filter, 500}$$

$$= \begin{bmatrix} \sigma_{N_{W_i}}^2 & 0 \\ 0 & \sigma_{N_{\dot{W}_i}}^2 \end{bmatrix}_k, \text{ for the } \Delta \text{ filter, 600}$$

$\sigma_{N_{R_{si}}}^2, \sigma_{N_{\dot{R}_{si}}}^2$ = measurement variances of the range sum and range sum rate of $i^{th}$ cluter cell -continued $\sigma^2_{u_{r_i}}, \sigma^2_{u_{\dot{r}_i}}$ = measurement variances of the differential bistatic range and range rate of the $i^{th}$ clutter cell The state vector of the transmitter aircraft flight parameters is updated at each scan to form a track of the transmitter for use in processing the bistatic radar data. The elements of the state vector are given by $$X_k = \begin{bmatrix} X_I \\ \dot{X}_I \\ \ddot{X}_I \\ Y_I \\ \dot{Y}_I \\ \ddot{Y}_I \\ Z_I \\ \dot{Z}_I \\ \ddot{Z}_I \end{bmatrix}_k \quad (25)$$

where $(X_I, Y_I, Z_I)$ = inertial position coordinates of the transmitter $(\dot{X}_I, \dot{Y}_I, \dot{Z}_I)$, $(\ddot{X}_I, \ddot{Y}_I, \ddot{Z}_I)$ = velocity and acceleration components of the transmitter The transition from one state to the next is represented by $$X_k = \Phi(k, k-1)X_{k-1} + B(k, k-1)V_{k-1}$$

where
$\Phi(k, k-1)$ = state transition matrix from state $k-1$ to state $k$
$B(k, k-1)V_{k-1}$ = model mismatch or driving noise The state transition matrix for this system is a Newtonian matrix of the form $$\phi(k, k-1) = \qquad (26)$$

$$\begin{bmatrix} \phi'(,k-1) & & 0 \\ & \phi'(k,k-1) & \\ 0 & & \phi'(k,k-1) \end{bmatrix}, (9 \times 9) \text{ matrix}$$

where $$\phi'(k, k-1) = \begin{bmatrix} 1 & \Delta t_{k,k-1} & \frac{1}{2}\Delta t^2_{k,k-1} \\ 0 & 1 & \Delta t_{k,k-1} \\ 0 & 0 & 1 \end{bmatrix}$$

$\Delta t_{k,k-1}$ = time interval between state $k-1$ and state $k$

The filter state vector does not necessarily obey the transition established by the transition matrix, $\Phi(k, k-1)$, due to the higher-order derivatives of the trajectory not modeled in the state vector. The quantity $B(k, k-1)V_{k-1}$ represents this transition. The filter deweighting matrix is defined as $$Q_{k,k-1} = E[B(k,k-1)V_{k-1}V^T_{k-1}B^T(k,k-1)] \qquad (27)$$
$$= B(k,k-1)L_{k-1}B^T(k,k-1)$$

where $$L_{k-1} = E[V_{k-1}V_{k-1}^T]$$

If the next higher-order derivative in the X,Y,Z transmitter aircraft coordinates is considered, the model error is $$B(k, k-1)V_{k-1} = \qquad (28)$$

$$\begin{bmatrix} B'(k, k-1) & & 0 \\ & B'(k, k-1) & \\ 0 & & B'(k, k-1) \end{bmatrix} \begin{bmatrix} 0 \\ 0 \\ \dddot{X} \\ 0 \\ 0 \\ \dddot{Y} \\ 0 \\ 0 \\ \dddot{Z} \end{bmatrix}_{k-1}$$

where $$B'(k, k-1) = \begin{bmatrix} 0 & 0 & \Delta t^3/3! \\ 0 & 0 & \Delta t^2/2 \\ 0 & 0 & \Delta t \end{bmatrix}$$

$\Delta t = \Delta t_{k,k-1}$

The deweighting matrix can be obtained by performing the indicated matrix operations to yield $$Q_{k,k-1} = \begin{bmatrix} \sigma^2_{\dddot{X}} Q'_{k,k-1} & & 0 \\ & \sigma^2_{\dddot{Y}} Q'_{k,k-1} & \\ 0 & & \sigma^2_{\dddot{Z}} Q'_{k,k-1} \end{bmatrix} \qquad (29)$$

where $$Q'_{k,k-1} = \begin{bmatrix} (\Delta t^3/3!)^2 & (\Delta t^3/3!)(\Delta t/2) & (\Delta t^3/3!)\Delta t \\ (\Delta t^3/3!)(\Delta t/2) & (\Delta t^2/2)^2 & (\Delta t^2/2)\Delta t \\ (\Delta t^3/3!)(\Delta t) & (\Delta t^2/2)\Delta t & \Delta t^2 \end{bmatrix}$$

$\sigma^2_{\dddot{X}}, \sigma^2_{\dddot{Y}}, \sigma^2_{\dddot{Z}} = X, Y, Z$ jerk components The deweighting adds fading to the filter, which causes the past data to be weighted less than the new data. As a practical matter, irrespective of the model mismatch, deweighting must be added to the filter to keep the gains from approaching zero during a long track.

The nonlinear transformation which relates the state vector and the receiver and clutter coordinates and to the range-doppler-measurements must be evaluated at each iteration of the filter. The transformation matrix for the filter is defined as $$h(\hat{X}_{k,k-1}, Z_k) = \begin{bmatrix} h'(\hat{X}_{k,k-1}, Z_{1k}) \\ h'(\hat{X}_{k,k-1}, Z_{2k}) \\ \vdots \\ h'(\hat{X}_{k,k-1}, Z_{Nck}) \end{bmatrix}, (2N_c \times 1) \text{ matrix} \quad (30)$$

$$h'(\hat{X}_{k,k-1}, Z_{ik}) = \begin{bmatrix} R + U \\ \bar{V}_I \cdot \bar{i}_U + \bar{V}_R \cdot \bar{i}_D \end{bmatrix}_{X_{k,k-1}, Z_{ik}}$$

for the $\Sigma$ filter $$= \begin{bmatrix} R + U - D \\ \bar{V}_I \cdot \bar{i}_U + \bar{V}_R \cdot \bar{i}_R - (\bar{V}_I - \bar{V}_R) \cdot \bar{i}_D \end{bmatrix}_{X_{k,k-1}, Z_{ik}}$$

for the $\Delta$ filter where $Z_{ik}$ = variable representing the receiver and clutter geometry data for the $i^{th}$ clutter cell at the $k^{th}$ filter sample or scan (i.e., $(X_R, Y_R, Z_R)_k$, $(\dot{X}_R, \dot{Y}_R, \dot{Z}_R)_k$ and $(X_c, Y_c, Z_c)_{ik}$)

The receiver and clutter data, $Z_{ik}$, is required for every clutter cell at each filter sample to evaluate the data transformation, h( ) and the Jacobian matrix, $H_k$.

The clutter position data for the $i^{th}$ clutter cell, $(X_c, Y_c, Z_c)$ is related to the measured range and doppler of the cell by using antenna monopulse/frequency estimation techniques. The clutter Doppler, $\dot{R}_s$, for a given range, $R_s$, is determined for cells at the center of the receiver antenna beam by these techniques.

Figure 8:
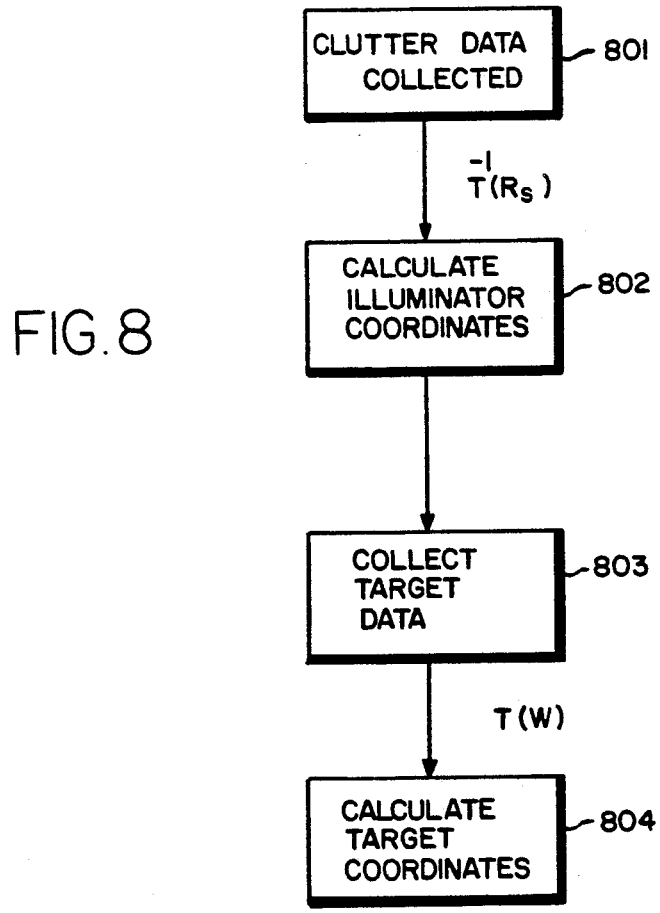
FIG. 8 is another simplified block diagram of the steps of the target acquisition process.

FIG. 8 is a sketch illustrating the preferred operation of a bistatic radar with the present invention. The first step in the operation process, is the collection of clutter data, 801. The clutter cell data includes: $R_{ci}$, $\dot{R}_{ci}$, $\theta_{ci}$ and $\theta_{ci}$ (the clutter cell range, range rate, azimuth and elevation).

If the bistatic system uses direct path data, then the radar measures the target range difference W; if the direct path data is not used, the radar measures the target range sum $R_s$.

In the operation depicted in FIG. 8, direct path data is not used, and the range sum and range rate data is formatted as shown in equation 23a:

$$Y_{ik} = \begin{bmatrix} R_{si} \\ \dot{R}_{si} \end{bmatrix}_k, N_{ik} = \begin{bmatrix} N_{Rsi} \\ N_{\dot{R}si} \end{bmatrix}$$

Next, the illuminator coordinates are calculated 802, using the algorithm of equation 22:

$$\hat{X}_{k,k} = \hat{X}_{k,k-1} + G_k(Y_k - h(\hat{X}_{k,k-1}, Z_k))$$

After the illuminator coordinates are known 802, target data is collected to include: $R_s$, $\dot{R}_s$, $\theta_T$, $\phi_T$, when direct path data is not used; or W, $\dot{W}$, $\theta_T$, $\phi_T$ when direct path data is used.

Once the illuminator-to-receiver range is known (either by the direct range measurements to yield D; or by extrapolation from the knowledge of: both the illuminator coordinates (as calculated in step 802) and the receiver coordinates (as given difference W is available, either from measurement or equations 1 and 2:

$W = R_s - D = (U + R_T) - D$ where:

D = the illuminator-to-receiver range;
U = the illuminator-to-target range;
$R_T$ = the receiver-to-target range;
W = the target range difference $(R_s - D)$; and
$R_s$ = the target range sum $(U + R_T)$.

Finally, in step 804, the bistatic geometry is solved to locate the target with respect to the receiver aircraft for target tracking and weapon delivery by using the bistatic transformation given in Equations 6 and 7a,b,c, presented earlier and rewritten below: the range to the target can then be expressed as $$R_T = \frac{1}{2} \frac{R_s^2 - D^2}{R_s - D(\bar{i}_R \cdot \bar{i}_D)} \quad (5)$$

or equivalently $$R_T = \frac{1}{2} \frac{W^2 + 2WD}{W + D - D(\bar{i}_R \cdot \bar{i}_D)} \quad (6)$$

where $W = R_s - D = U + R_T - D$, target bistatic differential range; and $$X_T = R_T \cos \phi'_T \cos \theta'_T \quad (7A)$$

$$Y_T = R_T \cos \phi'_T \sin \theta'_T \quad (7B)$$

$$Z_T = R_T \sin \phi'_T \quad (7C)$$

The target elevation and azimuth angles, $\phi'_T$ and $\theta'_T$, are measured by the bistatic receiver in a manner similar to that of monostatic radars. Thus, by measuring the target elevation and azimuth angle, the illuminator parameters D, $\phi'_I$, $\theta'_I$, and the target range sum, $R_s$ or (or equivalently bistatic differential range, W,) the target can be uniquely located with respect to the receiver.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. In combination with an airborne bistatic radar system with a radar transmitter on an illuminator aircraft which transmits radar signals, and a bistatic radar receiver on a penetrator aircraft which receives said radar signals, a process of determining a location of a target, said location containing a measure of range from said target to said penetrator aircraft, denoted as $R_T$, and a measure of elevation and azimuth from said penetrator aircraft to said location of said target, denoted respectively as $\phi_T$ and $\theta_T$, said process comprising the steps of:

calibrating said bistatic receiver on said penetrator aircraft by using an active radar transmitter and said bistatic radar receiver to determine an initial location of said illuminator aircraft, and therefrom a calibration of timing of when said radar signals are transmitted from said illuminator aircraft;

continually collecting clutter data on a plurality of clutter points, each of said clutter data containing a measure of a clutter point target range sum, denoted by $R_{cs}$, range sum rate, denoted by $\dot{R}_{cs}$, and clutter point elevation and azimuth with respect to the penetrator aircraft, denoted respectively as $\phi_c$ and $\theta_c$;

continually calculating an illuminator state for said illuminator aircraft by applying an inverse bistatic transformation to said clutter point range sum and range sum rate measured by said bistatic receiver in said penetrator aircraft, said illuminator state being a measure of a position and velocity of said illuminator aircraft;

collecting bistatic target echo return signals by said bistatic radar receiver on said penetrator aircraft as said reflected off of said target, a measure of a target range sum, denoted by $\dot{R}_s$, a target range sum rate, denoted by $R_s$, and target elevation and azimuth denoted by $\phi_T$ and $\theta_T$;

calculating a target range difference value for said target location; and calculating an equivalent monostatic range for said location of said target, denoted $R_T$, using a bistatic transformation on said target range difference value.

2. A process as defined in claim 1, wherein said penetrator aircraft acquires direct path measurements from said illuminator aircraft prior to said calculating an equivalent monostatic range step, said direct path measurements including a measure of range between said penetrator aircraft and said illuminator aircraft and a measure of range rate between said penetrator aircraft and said illuminator aircraft, said direct path measurements serving to refine and improve estimates made on said illuminator state.

3. In combination with an airborne bistatic radar system with a radar transmitter on an illuminator aircraft which transmits radar signals, and a bistatic radar receiver on a penetrator aircraft which receives said radar signals un the form of clutter point echo return signals, target echo return signals, and direct path data signals, a bistatic radar synchronization system, said bistatic radar synchronization system being located on said penetrator aircraft and receiving radar signals from said bistatic radar receiver, said bistatic radar synchronization system being capable of determining the position and velocity of said illuminator aircraft using sad clutter point echo return signals, said bistatic radar synchronization system comprising:

an inertial navigation system producing an output signal containing the position and velocity of said penetrator aircraft; and a doppler estimation means receiving said clutter point echo return signals from said bistatic radar receiver, said clutter point echo return signals indicating a measure of a clutter point target range sum which equals a sum of: illuminator-to-clutter point range plus clutter point-to-receiver range, said doppler estimation means outputting a clutter point range sum rate which represents an amount of change observed in measures of said clutter point target range sum;

a filter means receiving: said clutter point echo return signals from said bistatic radar receiver, said clutter point target range sum rate from said doppler estimation means and said output signal from said inertial navigation system, said filter means, producing an output signal which indicates the position and velocity of said illuminator aircraft.

4. A bistatic radar synchronization system, as defined in claim 3, wherein said filter means comprises:

a sum filter which indicates the position and velocity of said illuminator aircraft using an illuminator locator algorithm on: said clutter point target range sum received from said bistatic radar receiver, said clutter point target range sum rate received from said doppler estimation means, and said output signal from said inertial navigation system, said illuminator locator algorithm, for regular terrain, being given by;

$$\hat{X}_{k,k} = \hat{X}_{k,k-1} + G_k(Y_k - h(\hat{X}_{k,k-1}, Z_k)).$$

where: X $X_{k,k-1} = \Phi(k,k-1)X_{k-1,k-1}$, predicted value of a $k^{th}$ state given $k-1$ measurements such that each solution for $X_k$ yields said illuminator state as shown in this matrix:

$$X_k = \begin{bmatrix} X_I \\ \dot{X}_I \\ \ddot{X}_I \\ Y_I \\ \dot{Y}_I \\ \ddot{Y}_I \\ Z_I \\ \dot{Z}_I \\ \ddot{Z}_I \end{bmatrix}_k$$

where $(X_I, Y_I, Z_I)$ = inertial position coordinates of said illuminator aircraft, and $(\dot{X}_I, \dot{Y}_I, \dot{Z}_I)$, $(\ddot{X}_I, \ddot{Y}_I, \ddot{Z}_I)$ = velocity and acceleration components of said illuminator aircraft;

$G_k = P_{k,k-1}H_k^T(R_k + H_k P_{k,k-1}H_k^T)^{-1}$, filter gain matrix $h(\hat{X}_{k,k-1}, Z_k)$ = nonlinear transformation evaluated at $X_{k,k-1}, Z_k$, and is presented in this matrix:

$$h(\hat{X}_{k,k-1}, Z_k) = \begin{bmatrix} h'(\hat{X}_{k,k-1}, Z_{1k}) \\ h'(\hat{X}_{k,k-1}, Z_{2k}) \\ \vdots \\ h'(\hat{X}_{k,k-1}, Z_{Nck}) \end{bmatrix}$$

$\Phi(k,k-1)$ = state transition matrix from state $k-1$ to state k which is expressed in this matrix:

$$\Phi(k, k-1) = \begin{bmatrix} \Phi'(k, k-1) & & 0 \\ & \Phi'(k, k-1) & \\ 0 & & \Phi'(k, k-1) \end{bmatrix}$$

where $$\Phi'(k, k-1) = \begin{bmatrix} 1 & \Delta t_{k,k-1} & \frac{1}{2}\Delta t_{k,k-1}^2 \\ 0 & 1 & \Delta t_{k,k-1} \\ 0 & 0 & 1 \end{bmatrix}$$

where $\{t_{k,k-1}$ = time interval between state $k-1$ and state k;

$P_{k,k-1} = \Phi(k,k-1)P_{k-1,k-1}\Phi^T(k,k-1)+Q_{k,k-1}$, predicted covariance matrix;

$R_k$ = data noise covariance matrix given by:

$$R_k = \begin{bmatrix} \sigma_1^2 & & & 0 \\ & \sigma_2^2 & & \\ & & \ddots & \\ 0 & & & \sigma_{N_c}^2 \end{bmatrix}_k \text{ where:}$$

$$\sigma_{ik}^2 = \begin{bmatrix} \sigma_{NRsi}^2 & 0 \\ 0 & \sigma_{N\dot{R}si}^2 \end{bmatrix}_k$$

$\sigma_{NRsi}^2, \sigma_{N\dot{R}si}^2$ = measurement variances of range sum and range sum rate of an $i^{th}$ clutter cell;

$Y_k$ = filter data matrix for a $k^{th}$ sample where $Y_k = Y'_k - N_k$, and $$Y_{ik} = \begin{bmatrix} R_{si} \\ \dot{R}_{si} \end{bmatrix}_k, \quad N_{ik} = \begin{bmatrix} N_{Rsi} \\ N_{\dot{R}si} \end{bmatrix}_k, \text{ and}$$

$R_{si}, \dot{R}_{si}$ = range sum and range sum rate of an $i^{th}$ clutter cell, and $N_{Rsi}$ and $N_{\dot{R}si}$ are noise terms occuring in $R_{si}$ and $\dot{R}_{si}$.

$H_k = \frac{\partial h}{\partial X} \hat{X}_{k,k-1}, Z_k$.

Jacobian matrix evaluated at $X_{k,k-1}, Z_k$ where $$\frac{\partial h}{\partial X} = \begin{bmatrix} \frac{\partial R_s}{\partial X} & \frac{\partial R_s}{\partial X_I} & \frac{\partial R_s}{\partial X_I^{'}} & \cdots & \frac{\partial R_s}{\partial Z_I^{'}} \\ \frac{\partial R_s}{\partial X} & \frac{\partial R_s}{\partial X_I} & & \cdots & \frac{\partial R_s}{\partial Z_I^{'}} \end{bmatrix} ; \text{ and}$$

$Z_k$ = clutter position data and receiver position and velocity data for a $k^{th}$ sample $Z_{ik}$ = variable representing the receiver and clutter geometry data for $i^{th}$ clutter cell at $k^{th}$ filter sample or scan (i.e., $(X_R,Y_R,Z_R)_k$, $(\dot{X}_R,\dot{Y}_R,\dot{Z}_R)_k$ and $(X_c,Y_c,Z_c)_{ik}$).

5. A bistatic synchronization system as defined in claim 4 including a synchronization means, said synchronization means receiving said output signal from said sum filter and any direct path data signals from said bistatic radar receiver, said direct path data signals being radar signals received by said bistatic radar receiver in a direct path from said radar transmitter on said illuminator aircraft and indicating measure of the position and velocity of said illuminator aircraft, said synchronization means producing an illuminator state signal which indicates the position and velocity of said illuminator aircraft by outputting said direct path data signals when they are available, and outputting said output signal of said sum filter when said direct path data signals are not received by said bistatic radar receiver.

6. In combination with an airborne bistatic radar system with a radar transmitter on an illuminator aircraft which transmits radar signals, and a bistatic radar receiver on a penetrator aircraft which receives said radar signals in the form of clutter point echo return signals, target echo return signals, and direct path data signals, a bistatic radar synchronization system being located on said penetrator aircraft and receiving radar signals from said bistatic radar receiver, said bistatic radar synchronization system being capable of determining the position and velocity of said illuminator aircraft, said bistatic radar synchronization system comprising:

a summing junction which outputs a target range difference signal which it produces by subtracting an illuminator range signal from a target range sum signal, said illuminator range signal being a measure of distance between said illuminator aircraft and said penetrator aircraft, said illuminator range signal being contained in said direct path data signals which are received by said summing junction from said bistatic radar receiver, said target range sum signal being a measure of range between said illuminator and said clutter point plus range between a clutter point and said penetrator aircraft, said target range sum signal being contained in said clutter point echo return signals which are received by said summing junction from said bistatic radar receiver;

a doppler estimation means receiving said clutter point echo return signals and said direct path data signals from said bistatic radar receiver and outputting a target range difference rate signal which indicates a rate of change in said target range difference signal; and a filter means receiving said target range difference signal from said summing junction, and said target range difference rate signal from said doppler estimation means, said filter means producing an output signal which indicates the position and velocity of said illuminator aircraft.

7. A bistatic radar synchronization system as defined in claim 6 wherein said filter means comprises a difference filter which indicates the position and velocity of said illuminator aircraft using an illuminator locator algorithm on:

said target range difference signal received from said summing junction, said target range difference rate signal received from said doppler estimation means, and said output signal from said inertial navigation system, said illuminator locator algorithm, for regular terrain, being given by:

$$\hat{X}_{k,k-1} = \hat{X}_{k,k-1} + G_k(Y_k - h(\hat{X}_{k,k-1}, Z_k)),$$

where:

$\hat{X}_{k,k-1} = \Phi(k,k-1)\hat{X}_{k-1,k-1}$, predicted value of a $k^{th}$ state given $k-1$ measurements such that each solution for $\hat{X}_k$ yields said illuminator state in the following matrix:

$$X_k = \begin{bmatrix} X_I \\ \dot{X}_I \\ \ddot{X}_I \\ Y_I \\ \dot{Y}_I \\ \ddot{Y}_I \\ Z_I \\ \dot{Z}_I \\ \ddot{Z}_I \end{bmatrix}_k$$

where $(X_I, Y_I, Z_I)$ = inertial position coordinates of said illuminator aircraft, and $(\dot{X}_I, \dot{Y}_I, \dot{Z}_I)$, $(\ddot{X}_I, \ddot{Y}_I, \ddot{Z}_I)$ = velocity and acceleration components of said illuminator aircraft;

$G_k = P_{k,k-1} H_k^T (R_k + H_k P_{k,k-1} H_k^T)^{-1}$, filter gain matrix $h(\hat{X}_{k,k-1}, Z_k)$ = nonlinear transformation evaluated at $\hat{X}_{k,k-1}$, $Z_k$, and is presented in the following matrix:

$$h(\hat{X}_{k,k-1} Z_k) = \begin{bmatrix} h'(\hat{X}_{k,k-1}, Z_{1k}) \\ h'(\hat{X}_{k,k-1}, Z_{2k}) \\ \vdots \\ h'(\hat{X}_{k,k-1}, Z_{N_c k}) \end{bmatrix};$$

$\Phi(k, k-1)$ = state transition matrix from state $k-1$ to state k which is expressed in the following matrix:

$$\Phi(k, k-1) = \begin{bmatrix} \Phi'(k, k-1) & & 0 \\ & \Phi'(k, k-1) & \\ 0 & & \Phi'(k, k-1) \end{bmatrix}$$

where $$\Phi'(k, k-1) = \begin{bmatrix} 1 & \Delta t_{k,k-1} & \frac{1}{2}\Delta t_{k,k-1}^2 \\ 0 & 1 & \Delta t_{k,k-1} \\ 0 & 0 & 1 \end{bmatrix}$$

where $\Delta t_{k,k-1}$ = time interval between state $k-1$ and state k;

$P_{k,k-1} = \Phi(k,k-1) P_{k-1,k-1} \Phi^T(k,k-1) + Q_{k,k-1}$, predicted covariance matrix;

$R_x$ = data noise covariance matrix given by:

$$R_k = \begin{bmatrix} \sigma_1^2 & & & 0 \\ & \sigma_2^2 & & \\ & & \ddots & \\ 0 & & & \sigma_{N_c}^2 \end{bmatrix}_k \quad \text{where:}$$

$$\sigma_{ik}^2 = \begin{bmatrix} \sigma_{NRsi}^2 & 0 \\ 0 & \sigma_{N\dot{R}si}^2 \end{bmatrix}_k \quad \text{where:}$$

$\sigma_{NRsi}^2, \sigma_{N\dot{R}si}^2$ = measurement variances of differential bistatic range and range rate of an $i^{th}$ clutter cell, and $Y_k$ = filter data matrix for a $k^{th}$ sample where $Y_k = Y'_k - N_k$, and $\sigma_{W_1}^2, \sigma_{W_2}^2$ = measurement variances of differential bistatic range and range rate of an $i^{th}$ clutter cell, and $Q_{k,k-1}$ = deweighting matrix $$Q(k, k-1) = \begin{bmatrix} \sigma_{\ddot{X}}^2 \cdot Q'k, k-1 & & 0 \\ & \sigma_{\ddot{Y}}^2 Q'k, k-1 & \\ 0 & & \sigma_{\ddot{Z}}^2 \cdot Q'k, k-1 \end{bmatrix}$$

where $$Q'_{k,k-1} = \begin{bmatrix} (\Delta t^3/3!)^2 & (\Delta t^3/3!)(t/2) & (\Delta t^3/3!)\Delta t \\ (\Delta t^3/3!)(t/2) & (\Delta t^2/3!)(t/2) & (\Delta t^2/2)\Delta t \\ (\Delta t^3/3!)(\Delta t) & (\Delta t^2/2)\Delta t & \Delta t^2 \end{bmatrix}$$

$\sigma_{\ddot{X}}^2, \sigma_{\ddot{Y}}^2, \sigma_{\ddot{Z}}^2 = X, Y, Z$ jerk components, and $\Delta t_{k,k-1}$ = time interval between state $k-1$ and state k
$y_k$ = filter data matrix for a $k^{th}$ sample where $Y_k = Y'_k - N_k$, and $$Y_{ik} = \begin{bmatrix} W_i \\ \dot{W}_i \end{bmatrix}_k, \quad N_{ik} = \begin{bmatrix} N W_i \\ N \dot{W}_i \end{bmatrix}_k$$

$W_i, \dot{W}_i$ = differential bistatic range and range rate of an $i^{th}$ clutter cell, and
$NW_i$ and $N\dot{W}_i$ are noise terms occurring in $W_i$ and $\dot{W}_i$ $H_k = \frac{\partial h}{\partial x}\bigg|_{X_{k,k-1}, Z_k}$, Jacobian matrix evaluated at $$\frac{\partial h}{\partial x} = \begin{bmatrix} \frac{\partial W}{\partial X_I} & \frac{\partial W}{\partial \dot{X}_I} & \cdots & \frac{\partial W}{\partial Z_I} \\ \frac{\partial \dot{W}}{\partial X_I} & & \cdots & \frac{\partial \dot{W}}{\partial \dot{Z}_I} \end{bmatrix} \text{ and}$$

$Z_k$ = clutter position data and receiver position and velocity data for a $k^{th}$ sample where
$Z_{ik}$ = variable representing receiver and clutter geometry data for $i^{th}$ clutter cell at $k^{th}$ filter sample or scan (i.e., $(X_R, Y_R, Z_R)_k$, $(\dot{X}_R, \dot{Y}_R, \dot{Z}_R)_k$ $(X_c, Y_c, Z_c)_{ik}$.

* * * * *